United States Patent [19]

de Seroux et al.

[11] Patent Number: 5,182,076

[45] Date of Patent: Jan. 26, 1993

[54] METHOD FOR MONITORING THE EMPLACEMENT OF A TRANSPORTABLE ELEMENT AND THE TIGHTNESS OF ITS JOINT WITH A FIXED STRUCTURE, AND THE USE OF THIS METHOD

[75] Inventors: Nicolas de Seroux; Dominique Limouzin, both of Lyons, France

[73] Assignee: Framatome, Courbevoie, France

[21] Appl. No.: 749,276

[22] Filed: Aug. 23, 1991

[30] Foreign Application Priority Data

Aug. 28, 1990 [FR] France ................. 90 10725

[51] Int. Cl.⁵ ............................................ G21C 17/00
[52] U.S. Cl. .................................. 376/250; 376/247; 376/203; 376/205; 376/272; 73/37; 73/46
[58] Field of Search ............... 376/250, 272, 203, 205, 376/247; 976/DIG. 231, DIG. 232, DIG. 244, DIG. 245, DIG. 256, DIG. 259, DIG. 272, DIG. 167, DIG. 169, DIG. 171, DIG. 186; 73/37, 46

[56] References Cited

U.S. PATENT DOCUMENTS

| | | | |
|---|---|---|---|
| 3,929,253 | 12/1975 | Johnsson | 220/320 |
| 3,948,723 | 4/1976 | Andrea et al. | 176/30 |
| 3,982,134 | 9/1976 | Householder et al. | 250/506 |
| 4,168,394 | 9/1979 | Yuey | 174/151 |
| 4,195,457 | 4/1980 | Kissling et al. | 52/224 |
| 4,197,467 | 4/1980 | Williams | 250/506 |
| 4,202,201 | 5/1980 | Johnson | 73/40 |
| 4,274,007 | 6/1981 | Baatz et al. | 250/506 |
| 4,445,042 | 4/1984 | Baatz et al. | 250/506.1 |
| 4,495,139 | 1/1985 | Janberg et al. | 376/203 |

FOREIGN PATENT DOCUMENTS

| | | | |
|---|---|---|---|
| 3025795 | 1/1982 | Fed. Rep. of Germany | 376/272 |
| 3732547 | 6/1988 | Fed. Rep. of Germany | |
| 2582438 | 11/1986 | France | |

Primary Examiner—Donald P. Walsh
Assistant Examiner—Chrisman D. Carroll
Attorney, Agent, or Firm—Pollock, Vande Sande & Priddy

[57] ABSTRACT

The fixed structure (10) incorporates an abutment surface (10a) upon which a corresponding abutment surface (8a) of the transportable element (1) comes to bear, with the interposition between the abutment surfaces (8a, 10a) of at least two concentric annular sealing joints (13a, 13b). The pressure in the space (18) between the sealing joints (13a, 13b) and bounded by the abutment surfaces (8a, 10a) is measured during the emplacement of the transportable element (1) to determine whether it is leakproof. The measured maximum pressure and/or the variation of pressure measured over time is compared with predetermined values corresponding to a correct emplacement of the transportable element (1).

7 Claims, 1 Drawing Sheet

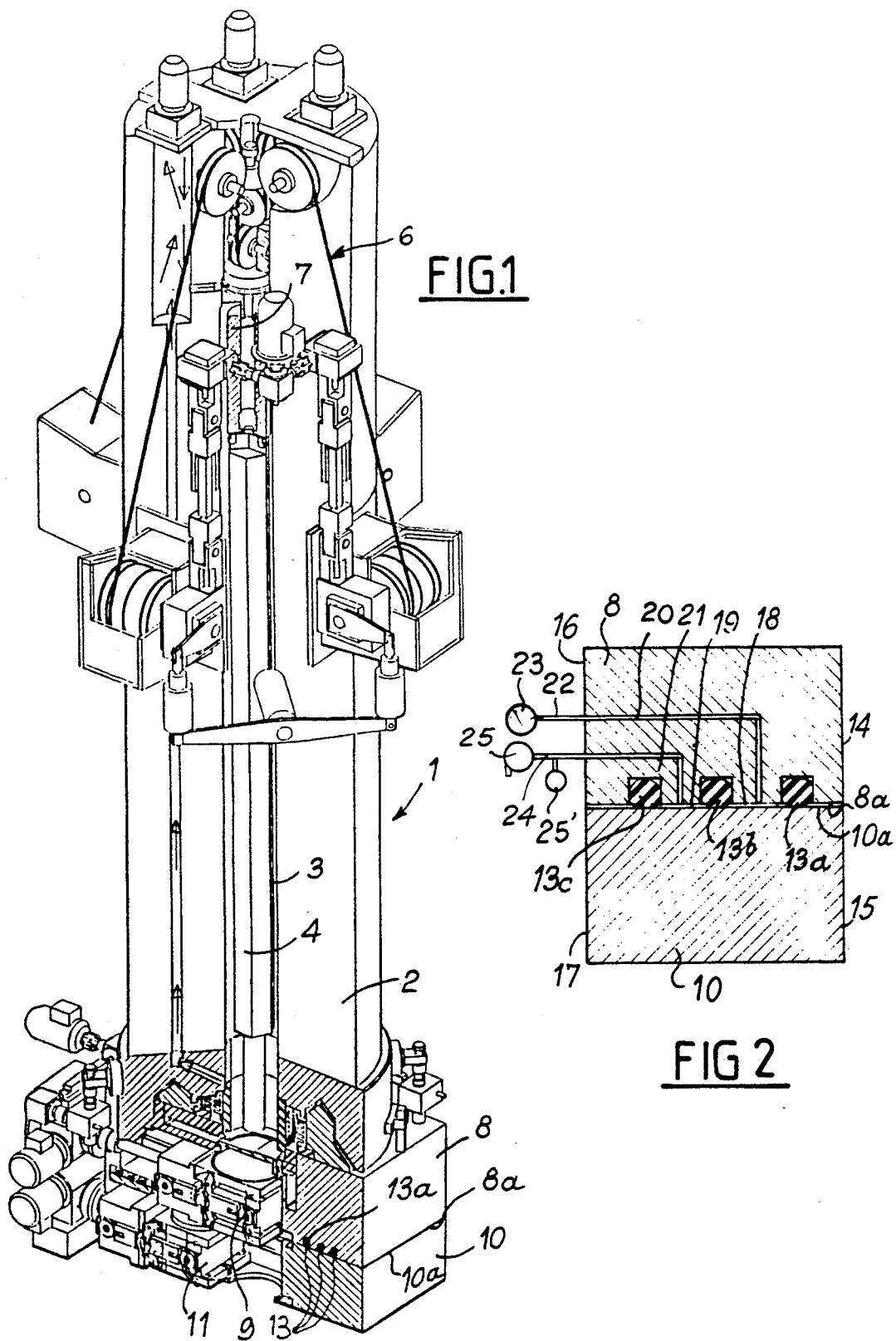

METHOD FOR MONITORING THE EMPLACEMENT OF A TRANSPORTABLE ELEMENT AND THE TIGHTNESS OF ITS JOINT WITH A FIXED STRUCTURE, AND THE USE OF THIS METHOD

FIELD OF THE INVENTION

The invention relates to a method for monitoring the emplacement and sealing of a transportable element on a fixed structure and to the use of this method for placing a transport cask for a fuel assembly of a fast neutron nuclear reactor on a fixed structure, such as the closure slab of the nuclear reactor vessel.

BACKGROUND OF THE INVENTION

Fast neutron nuclear reactors cooled by a liquid metal such as sodium contain a core formed by assemblies with an elongated prismatic shape immersed in the liquid sodium contained in the reactor vessel.

It may become necessary to remove the fuel assemblies from the reactor core inside the vessel, for example in order to replace spent or defective assemblies with new assemblies. The assemblies coming out of the reactor vessel are in an irradiated state and produce radioactive radiation. Moreover, these assemblies have residual activity and are the seat of a release of heat produced by the nuclear reactions in the irradiated fuel. Finally, these assemblies retain a certain amount of liquid sodium at the time when they emerge from the vessel.

The fuel assemblies coming out of the nuclear reactor vessel must therefore be disposed in containers ensuring the biological protection of the medium to which the assemblies are moved or in which they are temporarily stored. It is also necessary to cool the assembly while it is being transferred.

In order to carry out the transfer and temporary storage of fuel assemblies from fast neutron nuclear reactors, it is normal to use casks consisting of a solid body made of a material absorbing nuclear radiation in which a housing is provided for a fuel assembly, either in a bare state or embedded in a casing filled with sodium to cool it. These casks are fitted with valves at their lower part.

The assembly housing, in the shape of a central channel inside the cask body, emerges, through an opening which can be tightly closed, e.g., by a valve, into one of the ends of the cask body, so as to allow the assembly to be introduced into the cask and extracted from it. These operations are carried out after the system consisting of the transfer cask and its valve has been positioned so that it abuts onto a fixed structure, e.g., a structure attached to the closure slab of the reactor vessel, so that the central channel of the cask lies along the axial extension of a well passing through the fixed structure, e.g., of a vertical well passing through the slab.

A sealing device consisting of at least two concentric O-rings is interposed between the lower abutment surface of the valve support fitted on the transport cask and the corresponding abutment surface of the fixed structure. The device for tightly closing the opening in the central channel of the cask emerging on to the abutment surface of the valve support and a second device for tightly closing the upper end of the vertical well of the fixed structure emerging on to the abutment structure of the fixed structure are disposed inside the contact zone of the inner joint of the sealing device, in aligned axial positions.

A device for opening and tightly closing the communication passage between the central channel of the cask and the vertical well has been described in applicant's French Patent Application No. 90-08116, filed on Jun. 27, 1990. When the transport cask and its valve are being placed on the fixed abutment structure, it is necessary to check that this emplacement has been carried out correctly before opening the cask valve and the well valve putting the central housing of the cask into communication with the well passing through the slab. In fact, the well passing through the slab which communicates with the internal volume of the reactor and/or the housing of the cask which is capable of holding an irradiated fuel assembly contain radioactive gases which must be prevented from escaping to atmosphere when the valves are opened.

When it is being placed on the abutment surface, the valve of the very heavy transport cask produces a certain amount of compression of the joints, which enables a tight seal to be obtained as long as the compression of the joints is produced uniformly around their entire periphery. In cases where the cask is presented to the abutment surface in a position slightly inclined to the vertical, the compression of the joints carried by the valve is nevertheless correctly produced since the valve is decoupled from the cask structure by a flexible bellows system.

In order to monitor the emplacement of a transportable element such as a cask and the sealing between the abutment surface of the cask valve and the abutment surface of the fixed structure upon which the cask comes to bear, it is known to use monitoring devices providing for the introduction of a pressurized gas or the reduction in pressure with respect to the atmosphere of the space lying between the joints and bounded by the abutment surfaces of the valve and the fixed structure. The monitoring itself is carried out by using a manometric device to measure the rate of leakage of the pressurized gas in the direction of the atmosphere or of atmospheric air in the direction of the space between the joints.

Such a measurement takes a relatively long time, inasmuch as it requires prior pressurizing or evacuation of the space between the joints and continuous measurement of the pressure in this space over a period of time which may be lengthy. This implies the introduction of additional equipment and hence increased risk of breakdown.

As a result, there is a waiting time in the fuel assembly handling cycle, which correspondingly slows down the loading and unloading operations of the nuclear reactor. In fact, the loading and unloading of the nuclear reactor core necessitates many operations involving transfer of fuel assemblies, so that it is extremely important to reduce the operational time required for the transfer of an assembly as much as possible, with the aim of limiting the period during which the reactor is shut down.

Moreover, the prior art monitoring devices are relatively complex and have to include additional elements such as a reserve supply of pressurized gas or a vacuum pump.

SUMMARY OF THE INVENTION

The object of the invention is therefore to propose a method for monitoring the emplacement of a transportable element and the tightness of its joint with a fixed structure having an abutment surface upon which a corresponding abutment surface of the transportable element comes to bear, with the interposition between the abutment surfaces of at least two annular sealing joints arranged inside each other, these joints undergoing a certain amount of compression during the emplacement of the transportable element on the fixed structure, this method being simple to put into practice and allows the monitoring to be carried out efficiently and rapidly.

To this end, the pressure in the space between the sealing joints and bounded by the abutment surfaces of the transportable element and the fixed structure is measured during the emplacement of the transportable element, and the measured maximum pressure and/or the variation of pressure measured over time is compared with predetermined values corresponding to a correct emplacement of the transportable element.

BRIEF DESCRIPTION OF THE DRAWINGS

In order to enable the invention to be fully understood, a description will now be given, by way of example and with reference to the attached drawings, of a mode of implementing the method according to the invention, for the case of the emplacement of a transfer cask for a fuel assembly of a pressurized water nuclear reactor on a fixed structure of the reactor.

FIG. 1 is a general view, in exploded perspective and partly in cross-section, of a fuel assembly transfer cask for a fast neutron nuclear reactor, abutting by its own valve on a fixed structure.

FIG. 2 is a cross-sectional half view of the sealing device interposed between the abutment surfaces of the cask and the fixed structure, and of the means of implementing the method according to the invention.

DESCRIPTION OF PREFERRED EMBODIMENT

FIG. 1 shows a cask 2 for the transfer of a nuclear reactor fuel assembly. The cask 1 comprises a cask body 2 of a cylindrical shape incorporating in its central part and along its axis a channel 3 passing through the cask body over its whole length. The cask body consists of a solid piece of steel which is very thick and very long.

In the case of a fast neutron reactor fuel assembly whose length is greater than 4 m and which has a hexagonal cross-section with a side of length 125 mm, the cask body 2 has an outer diameter of 1.30 m, a central channel with a diameter of 0.30 m and a length of 6 m. The cask body thus has a wall thickness of 0.50 m; its total weight is about 55 tons.

In FIG. 1, the fuel assembly has been represented in its transport position inside the central channel 3 of the cask body. The assembly 4 occupies only a part of the length of the channel 3; the grab 7 of the assembly hoist 6 is placed in the upper part of the channel 3.

The lower part of the cask body 2 is connected by a flexible bellows joint system to the support 8 of a motor-driven cask valve 9 enabling the end of the channel 3 to be opened or tightly closed at its lower part which emerges into the end of the body 2.

The support 8 of the cask valve 9 is capable of coming to bear, by means of an abutment surface 8a, on a corresponding abutment surface 10a of the support 10 of a well valve 11 making it possible to open or tightly close a traversing well, e.g., a passage passing through a slab covering the reactor vessel containing liquid sodium and enclosing the reactor core.

A sealing device comprising O-rings 13 is interposed between the abutment surfaces 8a and 10a in the coupled position of the transfer cask 1 represented in FIG. 1.

The systems for closing the valves 9 and 11 are located inside the zone bounded by the O-ring 13a forming the inner part of the sealing device.

When the valves 9 and 11 are superposed, after the emplacement of the cask, and are open, the fuel assembly 4 can be made to pass from a position in which it is immersed in the liquid sodium filling the reactor vessel to its transfer position inside the cask 1 by using the hoist 6.

A part of the support 8 of the transport cask valve and of the support 10 of the well valve can be seen on a larger scale in FIG. 2.

The annular supports 8 and 10 have inner cylindrical surfaces, 14 and 15 respectively, directed towards the inside of the cask and the well, and outer surfaces, 16 and 17 respectively, in contact with the outside atmosphere.

Three O-rings 13a, 13b and 13c are disposed in corresponding seatings in the valve support 8, the said seatings having a depth which is less than the nominal diameter of the sealing rings 13a, 13b and 13c. In this way, when the cask valve is not in a position where it bears on the surface 10a of the support 10, a part of the sealing rings 13a, 13b and 13c protrudes with respect to the corresponding seating.

The sealing ring 13a, which is smaller than the sealing rings 13b and 13c, is located towards the inside and the sealing ring 13c, which is larger than the sealing rings 13a and 13b, is located towards the outside of the supports 8 and 10. The sealing ring 13b is located in an intermediate position.

The sealing rings 13a, 13b and 13c are arranged concentrically in corresponding seatings in the support 8.

When the cask has been placed on the fixed abutment structure, as represented in FIG. 2, the sealing rings 13a, 13b and 13c are compressed so as to produce a leakproof seal between the surfaces 8a and 10a. Moreover, the sealing rings 13 keep the surfaces 8a and 10a slightly separated from each other, so that there remains a first enclosed annular space 18 and a second enclosed space 19 bounded by the surfaces 8a and 10a that are slightly separated from each other, the space 18 being situated between the sealing rings 13a and 13b and the space 19 between the sealing rings 13b and 13c.

The support 8 is machined internally to form a first channel 20 emerging on the surface 8a between the seatings for the sealing rings 13a and 13b, and a second channel 21 emerging on the surface 8a between the seatings for the sealing rings 13b and 13c. When the cask is positioned in such a way as to allow its valve to come to bear on the abutment surface 10a of the support 10, the channel 20 emerges into the inner space 18 and the channel 21 into the outer space 19.

The channel 20 and the inner space 18 are connected by means of piping 22 to a manometer 23.

The channel 21 is connected by means of a duct 24 to a vacuum pump 25 and a manometer 25'.

During the emplacement of the cask on the abutment structure formed by the support 10, the heavy cask valve produces compression of the sealing rings 13a, 13b and 13c, this compression generally amounting to between 20 and 40% of the diameter of the sealing rings. Such a compression of the sealing rings produces a reduction in the volume of the spaces 18 and 19 located between the sealing rings during the emplacement of the cask.

The air contained in the spaces located between the sealing rings is compressed, so that its pressure increases from atmospheric pressure to a pressure depending on the amount of compression of the sealing rings.

During the emplacement of the cask on the support 10, the pressure in the inner space 18 is measured continuously by the manometer 23.

The pressure rises very rapidly during the emplacement of the cask, to reach a maximum when the sealing rings 13 are in their maximum state of compression.

The pressure is then maintained at the maximum value reached or at a value close to it, depending on the degree of sealing produced by the sealing rings 13a and 13b.

Prior to the use and the emplacement of the cask, the maximum gas pressure in the space 18 for a correct emplacement of the cask on a perfectly plane abutment surface is determined by calculation and/or calibration. Also determined is the variation of pressure with time over a very short period following the emplacement of the cask, still with the assumption of a correct emplacement of the cask.

The maximum pressure and the variations of this pressure over a very short period of the order of 30 seconds is compared with the corresponding value or predetermined variations.

In cases where the maximum pressure produced during an effective emplacement of the cask is substantially identical to the predetermined maximum pressure, it can be deduced that the cask valve has been correctly positioned, the measurement and the monitoring being almost instantaneous. A check is made over a period of 30 seconds that the pressure in the space 18 is maintained at a level close to the maximum value or decreases very slightly according to the predetermined law of variation.

Confirmation is obtained in this way that the sealing at the connection between the cask and the fixed structure is tight.

It is also possible to reduce the pressure in the space 19 by using the vacuum pump 25 after the emplacement of the cask. A means of correcting faults is thus made available in the case of unintended leakage or breakage of the seal during a handling operation.

The vacuum pump 25 makes it possible to evacuate any trace of gas capable of entering the space 19 and capable of coming from inside the cask and the vertical well, thus avoiding any external contamination.

The method according to the invention therefore makes it possible to verify almost instantaneously, or within a very short period of time, of the order of 30 seconds, the correct emplacement of the cask on an abutment surface.

Such monitoring can be carried out by using very simple means which are fixed, for example, on the support of the lower valve of the cask.

The method according to the invention therefore makes it possible, in particular, to reduce the time required to carry out the operations involved in replacing fuel assemblies of a fast neutron nuclear reactor cooled by liquid sodium.

In addition, the design is such that the cask valve can slide slightly, in a horizontal direction, over the valve of the fixed structure without breaking the sealing. This arrangement is useful in the event of earth tremors.

It is possible to use a measuring apparatus of any type to measure the pressure in the space located between the sealing rings during the emplacement of the cask. Such apparatus for measuring pressure can be connected to a recording device or to a means of display or of alarm making it possible to carry out rapid and accurate monitoring of the conditions for the emplacement of the cask on an abutment surface.

Finally, the method according to the invention can be used to monitor the emplacement of transportable elements other than a cask for handling fuel assemblies, such transportable elements incorporating at least two sealing rings coming into contact with an abutment surface of a fixed structure during the emplacement.

We claim:

1. Method for monitoring emplacement of a transportable element on an abutment surface of a fixed structure, said transportable element having an abutment surface and at least two compressible annular sealing joints arranged inside each other and protruding from said abutment surface of said transportable element, said method comprising the steps of
   (a) measuring a pressure of a gas in a space lying between said sealing joints and bounded by said abutment surfaces of said transportable element and of said fixed structure, continuously during emplacement of said abutment surface of said transportable element on said abutment surface of said fixed structure so that said transportable element comes to bear on said fixed structure through said joints which undergo progressive compression during said emplacement; and
   (b) comparing at least one value of the pressure measured during said emplacement with at least one predetermined value corresponding to a correct emplacement of said transportable element.

2. Method according to claim 1, wherein three sealing joints are interposed between said abutment surfaces of said transportable element (1) and of said fixed structure, respectively, during emplacement of said transportable element, said sealing joints being arranged inside each other, wherein the pressure in the space between a first joint and a second joint is measured, and the pressure in a second space between said second joint and a third joint is reduced when leakage or breakage of said sealing joint occurs during emplacement of said transportable element.

3. Method according to claim 2, wherein said transportable element comprises an internal housing lying along an extension of an internal space in said fixed structure, during its emplacement, wherein said first joint is smaller than said second sealing joint and said third sealing joint and is located towards the inside of said transportable element and said fixed structure, said third sealing joint is larger than said second sealing joint and said first sealing joint and is located towards the outside of said transportable element and said fixed structure, and said second sealing joint is located in an intermediate position between said first sealing joint and said third sealing joint.

4. Method according to claim 3, wherein said sealing joints are concentric O-rings.

5. Method according to any one of claims 1 to 4, wherein said pressure is measured in said space lying between said sealing joints for about 30 seconds.

6. Method according to any one of claims 1 to 4, wherein said sealing joints undergo a compression during said emplacement of said transportable element of 20 to 40% of their vertical dimension, and the weight of said transportable element (1) is then brought to bear on said fixed structure by coming to rest on it.

7. Method according to any one of claims 1 to 4, wherein the transportable element is a transport cask for a fuel assembly comprising a valve carried by a support at its lower part, a lower surface (8a) of a body of said valve forming the abutment surface of said cask (1), and wherein the pressure in the space between said sealing joints is measured by means of a channel machined in said support and emerging at an end thereof on the abutment surface between said sealing joints.

* * * * *